(12) United States Patent
Jiang

(10) Patent No.: US 11,788,622 B2
(45) Date of Patent: Oct. 17, 2023

(54) PISTON RING FOR ENGINE AND MACHINING METHOD OF PISTON RING

(71) Applicant: MAHLE Automotive Technologies (China) Co., Ltd, Shanghai (CN)

(72) Inventor: Wentao Jiang, Shanghai (CN)

(73) Assignee: Mahle Automotive Technologies (China) Co., Ltd.

( * ) Notice: Subject to any disclaimer, the term of this patent is extended or adjusted under 35 U.S.C. 154(b) by 0 days.

(21) Appl. No.: 17/523,900

(22) Filed: Nov. 10, 2021

(65) Prior Publication Data
US 2022/0145989 A1    May 12, 2022

(30) Foreign Application Priority Data
Nov. 11, 2020  (CN) .......................... 202011254017.1

(51) Int. Cl.
*F16J 9/20* (2006.01)
*C23C 18/16* (2006.01)
*F16J 9/26* (2006.01)

(52) U.S. Cl.
CPC ............. *F16J 9/20* (2013.01); *C23C 18/1689* (2013.01); *F16J 9/26* (2013.01)

(58) Field of Classification Search
CPC . F16J 9/00; F16J 9/12; F16J 9/20; F16J 9/26; F16J 9/28; C23C 18/1689
See application file for complete search history.

(56) References Cited

U.S. PATENT DOCUMENTS

| | | | |
|---|---|---|---|
| 9,132,517 B2 * | 9/2015 | Esser | F16J 9/20 |
| 9,163,726 B2 | 10/2015 | Favaron | |
| 10,634,248 B2 | 4/2020 | Matos Cordeiro Costa | |
| 2007/0252338 A1 * | 11/2007 | Maier | C23C 14/024 |
| | | | 277/443 |
| 2008/0256794 A1 * | 10/2008 | Maier | C23C 8/02 |
| | | | 29/888.07 |
| 2009/0174150 A1 | 7/2009 | Smith | |
| 2012/0205876 A1 * | 8/2012 | Fujimura | F16J 9/206 |
| | | | 277/440 |
| 2013/0328274 A1 * | 12/2013 | Sugiura | F16J 9/26 |
| | | | 277/444 |

(Continued)

FOREIGN PATENT DOCUMENTS

| | | |
|---|---|---|
| CN | 101586511 A | 11/2009 |
| CN | 101649791 A | 2/2010 |

(Continued)

OTHER PUBLICATIONS

Chinese Search Report dated Apr. 28, 2022 for copending Chinese App. No. 202011254017.1.

(Continued)

*Primary Examiner* — Gilbert Y Lee
(74) *Attorney, Agent, or Firm* — Fishman Stewart PLLC

(57) ABSTRACT

A piston ring for an engine may include a piston ring body. The piston ring body may include a working surface, a lower surface, an upper surface, and an inner surface. An area of the working surface and/or the lower surface which is close to an outer circumferential lower edge of the piston ring body is not provided with a nitride layer, the outer circumferential lower edge is formed with a chamfer, the chamfer does not have a nitride layer, and an additional area of the piston ring has a nitride layer.

16 Claims, 3 Drawing Sheets

(56) References Cited

U.S. PATENT DOCUMENTS

2014/0217677 A1* 8/2014 Smith .................. C23C 14/028
427/419.7
2015/0054222 A1 2/2015 Herbst-Dederichs
2015/0211621 A1 7/2015 Sandner

FOREIGN PATENT DOCUMENTS

| CN | 101910687 A | 12/2010 | | |
|---|---|---|---|---|
| CN | 102713373 A | 10/2012 | | |
| CN | 105179101 A | 12/2015 | | |
| CN | 205064110 U | 3/2016 | | |
| CN | 106062442 A | 10/2016 | | |
| CN | 106662246 A | 5/2017 | | |
| CN | 109488764 A | 3/2019 | | |
| CN | 209430756 U | 9/2019 | | |
| DE | 3502144 A1 * | 8/1985 | ................ | F16J 9/26 |
| DE | 102011084051 A1 | 4/2013 | | |
| DE | 112015000949 T5 | 11/2016 | | |
| WO | 2012126446 A1 | 9/2012 | | |

OTHER PUBLICATIONS

Chinese Office Action dated May 7, 2022 for copending Chinese App. No. 202011254017.1.

German Search Report dated Aug. 3, 2022 for copending German App. No. 102021212536.0 (w_machine_English_translation).

* cited by examiner

PISTON RING FOR ENGINE AND MACHINING METHOD OF PISTON RING

CROSS-REFERENCE TO RELATED APPLICATION

This application claims priority to Chinese Application No. CN202011254017.1, filed on Nov. 11, 2020, the contents of which is hereby incorporated by reference in its entirety.

TECHNICAL FIELD

The present disclosure relates to the technical field of auto parts, in particular to a piston ring for engine and a processing method for the piston ring.

BACKGROUND

The raised emission standard for auto engines and the demand for reduced fuel consumption require a piston ring to have a good oil scraping capability while satisfying the requirement for low friction power consumption. The piston ring is a part of the crank mechanism of auto engines. The piston ring is mounted in a piston ring groove of the piston. Meanwhile, the piston ring contacts the cylinder inner wall (cylinder liner). The piston ring may be divided into two kinds, namely, pneumatic ring (compression ring) and thrower ring (oil ring). The oil ring is capable of scraping redundant oil splashed onto the cylinder inner wall when running downwardly, thereby preventing redundant oil from entering the combustion chamber and participating in combustion. The piston ring is also capable of applying a uniform oil film on the cylinder inner wall when running upwardly to reduce wear due to friction between the piston, piston ring and cylinder. A compression ring can be enabled to have the function of oil scraping by providing a small chamfer on the outer circumferential surface (working surface) and the lower surface of the compression ring.

A piston ring for low friction power consumption requires to have lower elasticity. But a decrease in the elasticity of the piston ring may raise the risk of increasing oil consumption due to deteriorated sealing performance. Therefore, a piston ring of better oil scraping capability is needed to reduce, to some extent, the risk of increased oil consumption due to the reduced elasticity of the piston ring.

FIG. 1 shows a design of existing steel compression ring that is structured as a single ring. Each of the upper and lower surfaces 5, 4, the working surface 3, and the inner surface (inner circumferential surface) 6 of the piston ring is subjected to nitrogen treatment so that the piston ring is resistant to high temperature and wear. But such a design has the following disadvantage: the nitrogen treatment will cause the piston ring to become brittle and fragile. A conventional chamfer has a typical dimension of 0.15 mm. So large a chamfer greatly affects the oil scraping capability of the piston ring and thus has an adverse effect on oil consumption control. A chamfer of a smaller dimension becomes brittle after being subjected to existing nitrogen treatment and is easily damaged, and thus cannot fulfill the requirement for the oil scraping capability of the piston ring chamfer.

SUMMARY

In view of the problem of the prior art, the present disclosure proposes a piston ring for engine and a processing method for the piston ring, in particular a processing method for a chamfer of the piston ring.

The present disclosure proposes a piston ring for engine having a piston ring body comprising a working surface, a lower surface, an upper surface and an inner surface, wherein, an area of the working surface and/or the lower surface which is close to an outer circumferential lower edge of the piston ring body is not provided with a nitride layer, the outer circumferential lower edge is formed with a chamfer, the chamfer does not have a nitride layer, and other area of the piston ring has a nitride layer.

In at least one embodiment, an area of the piston ring body which is not provided with a nitride layer includes a working surface local area that is located on the working surface and is close to the outer circumferential lower edge.

In at least one embodiment, an area of the piston ring body which is not provided with a nitride layer includes a lower surface local area that is located on the lower surface and is close to the outer circumferential lower edge.

In at least one embodiment, an area of the piston ring body which is not provided with a nitride layer includes a working surface local area that is located on the working surface and is close to the outer circumferential lower edge, wherein the working surface local area is provided with a protective layer that prevents the piston ring body from nitridation; and/or an area of the piston ring body which is not provided with a nitride layer includes a lower surface local area that is located on the lower surface and is close to the outer circumferential lower edge, wherein the lower surface local area is provided with a protective layer that prevents the piston ring body from nitridation.

In at least one embodiment, an axial dimension and/or a radial dimension of an area of the piston ring body which is not provided with a nitride layer is larger than or equal to 0.05 mm and is smaller than or equal to 1.5 mm.

In at least one embodiment, an axial dimension and/or a radial dimension of the chamfer is smaller than or equal to 0.05 mm.

In at least one embodiment, an axial dimension and/or a radial dimension of the chamfer is larger than or equal to 0 mm and is smaller than or equal to 0.1 mm.

It is provided a processing method for the piston ring according to the present disclosure, the processing method comprises:

forming the chamfer at the outer circumferential lower edge;

providing a protective layer that prevents the piston ring body from nitridation at the working surface local area of the working surface close to the outer circumferential lower edge of the piston ring body and/or the lower surface local area of the lower surface close to the outer circumferential lower edge of the piston ring body and at the chamfer; and performing nitrogen treatment on the piston ring body.

In at least one embodiment, the protective layer that prevents the piston ring body from nitridation includes one of a chrome layer or a nickel layer, and the protective layer is provided on the piston ring body by a plating process including chemical plating.

It is provided a processing method for the piston ring according to the present disclosure, the processing method comprises:

forming a boss protruding from an area of the working surface and/or the lower surface close to the outer circumferential lower edge of the piston ring body;

performing nitrogen treatment on the piston ring body and the boss; and removing the boss and forming the chamfer at the outer circumferential lower edge.

Through the above technical solution, the present disclosure provides a piston ring for engine. Since no nitrogen treatment is performed on the piston ring in the area of outer circumferential lower edge, a piston ring with a chamfer not subjected to nitrogen treatment is obtained.

Through the above technical solution, the present disclosure provides a processing method for the piston ring. According to the method, the piston ring is not provided with a nitride layer in the area of the outer circumferential lower edge, thereby obtaining a piston ring with a chamfer not subjected to nitrogen treatment.

LIST OF REFERENCE SIGNS 1 piston ring body; 2 outer circumferential lower edge; 21 chamfer; 3 operation surface; 4 lower surface; 5 upper surface; 6 inner surface;
31 operation surface local area; 41 lower surface local area;
A axial direction; R radial direction.

DETAILED DESCRIPTION

Exemplary embodiments of the present disclosure are described below with reference to the attached drawings. It is appreciated that the specific description are only to illustrate how a person skilled in the art implements the present disclosure; it is neither intended to exhaust all possible implementations of the present disclosure nor to limit the scope of the present disclosure.

Generally, an engine includes a combustion chamber, a cylinder, a crankcase, and a piston located in the cylinder. The piston head is provided with a piston ring groove on which a piston ring is mounted. The piston ring, in particular a pneumatic ring, may be brought in contact with the cylinder inner wall (cylinder liner) and the piston ring groove for sealing. For the purpose of concise description, it is understood that a side where the combustion chamber (not shown) is arranged is referred to as the upper side; a side where the crankcase (not shown) is arranged is referred to as the lower side. However, the postures of the piston and the piston ring in use are not limited hereto.

Figure 1:
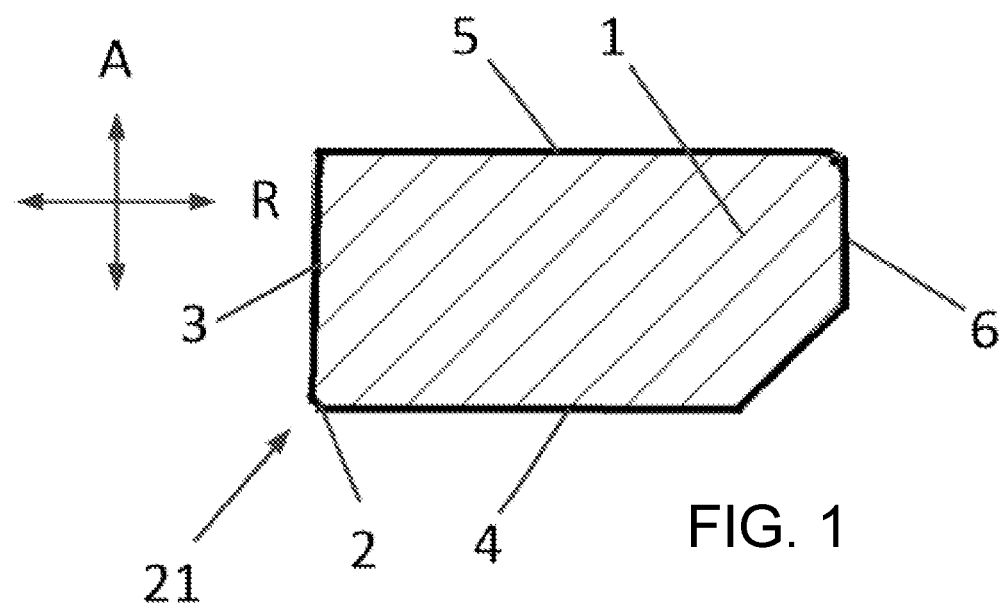
FIG. 1 is a schematic sectional view of a piston ring of the prior art.
Figure 2:
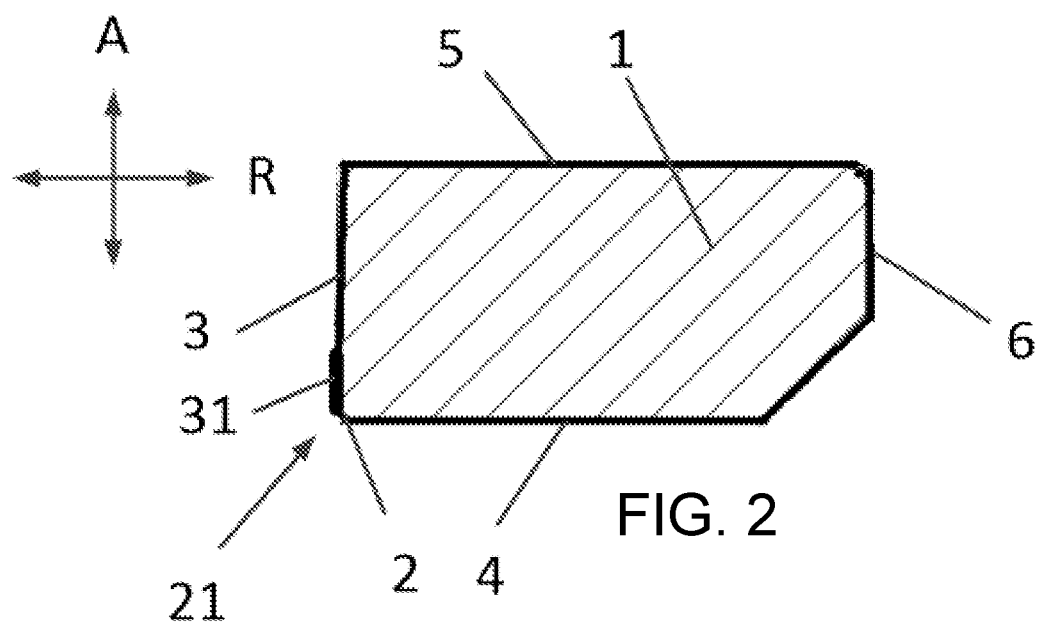
FIG. 2 to FIG. 4 are schematic sectional views of a piston ring not subjected to nitrogen treatment in a local area according to an embodiment of the present disclosure.

The present disclosure proposes a piston ring for engine. As shown in FIG. 2, a piston ring body 1 of the piston ring comprises a working surface 3, a lower surface 4, an upper surface 5 and an inner surface 6.

The piston ring of the embodiment may be a compression ring, and may be a single ring. In an operating state, the lower surface 4 of the piston ring body 1 faces towards the crankcase, and the lower surface 4 may contact a bottom portion (not shown) of the piston ring groove of the piston in the axial direction A. In the operating state, the upper surface 5 of the piston ring body 1 faces towards the combustion chamber, and the upper surface 5 may contact a top portion (not shown) of the piston ring groove of the piston in the axial direction A.

A distance from the lower surface 4 or the upper surface 5 to the piston ring groove is referred to as a side gap. It is understood that the lower surface 4 and the upper surface 5 cannot contact the piston ring groove simultaneously due to the presence of the side gap. In the operating state, the working surface 3 may contact the cylinder inner wall (cylinder liner, not shown) in the radial direction R. The inner surface 6 of the piston ring body 1 may not contact the piston ring groove accordingly.

Figure 3:
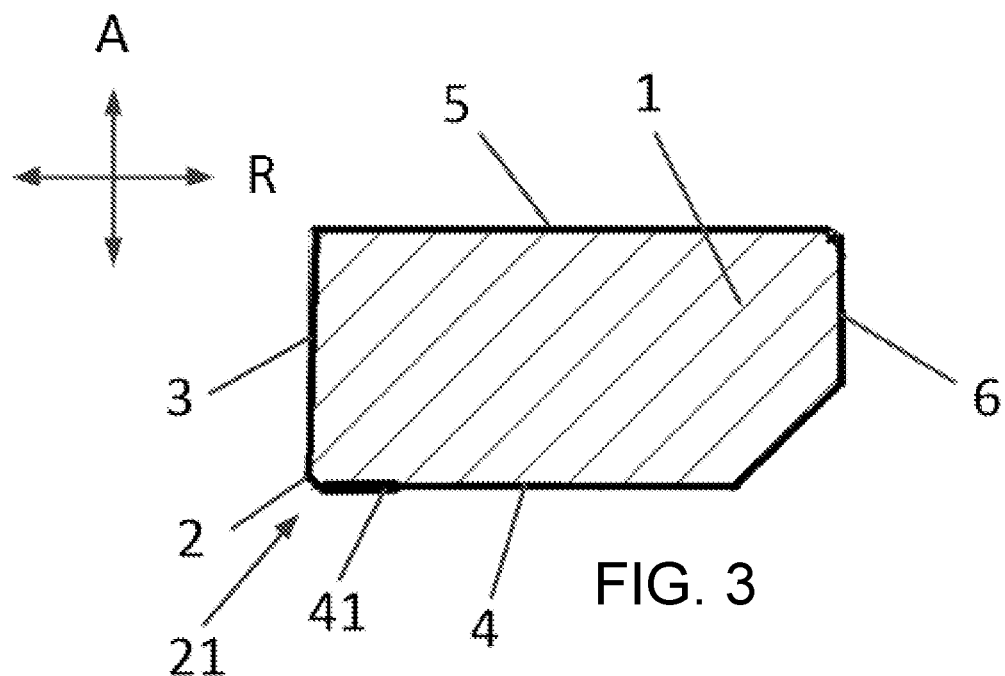
Figure 4:
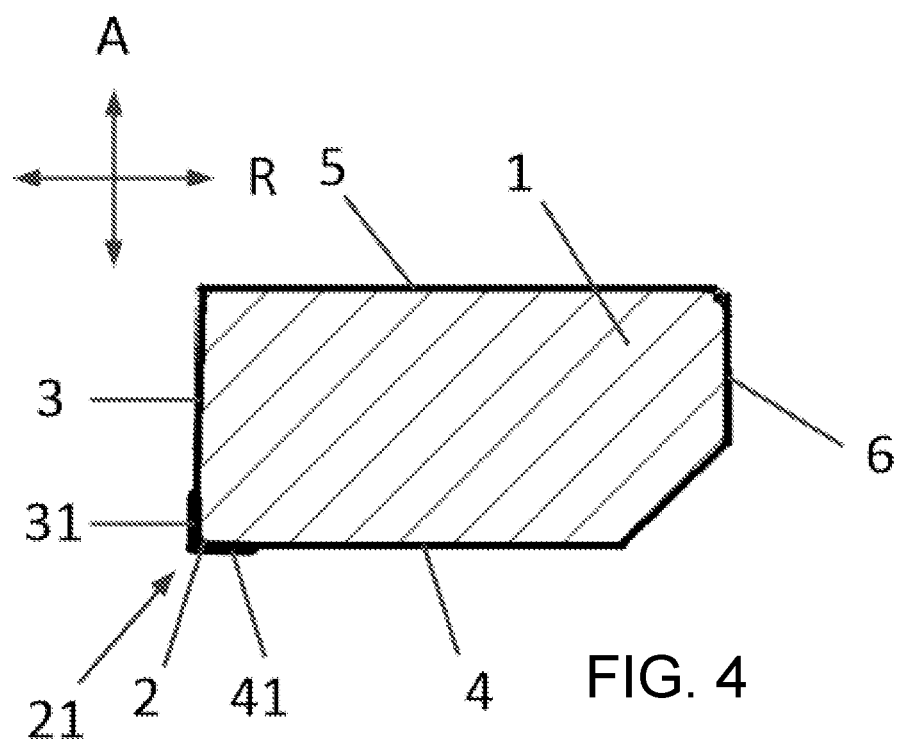

As shown in FIGS. 2, 3, and 4, in the present disclosure, an area of the working surface 3 and/or the lower surface 4 close to an outer circumferential lower edge 2 of the piston ring body 1 does not have a nitride layer. The outer circumferential lower edge 2 is formed with a chamfer 21 which also does not have a nitride layer. The other area of the piston ring has a nitride layer. It is understood that the chamfer 21 may be a straight chamfer or a round chamfer. In addition, a thicker line segment in the figures indicates the area not provided with a nitride layer.

As shown in FIG. 2, an area of the piston ring body 1 which is not provided with a nitride layer may include a working surface local area 31 that is located on the working surface 3 and is close to the outer circumferential lower edge 2. As shown in FIG. 3, an area of the piston ring body 1 which is not provided with a nitride layer may include a lower surface local area 41 that is located on the lower surface 4 and is close to the outer circumferential lower edge 2.

As shown in FIG. 4, the area of the piston ring body 1 which is not provided with a nitride layer may also include the working surface local area 31 that is located on the working surface 3 and is close to the outer circumferential lower edge 2 and the lower surface local area 41 that is located on the lower surface 4 and is close to the outer circumferential lower edge 2.

The area of the piston ring body 1 which is not provided with a nitride layer may have an axial dimension and/or radial dimension that is larger than or equal to 0.05 mm and is smaller than or equal to 1.5 mm. For example, the working surface local area 31 may have a dimension in the axial direction A that is larger than or equal to 0.05 mm and is smaller than or equal to 1.5 mm, such as 1 mm. For example, the lower surface local area 41 may have a dimension in the radial direction R larger than or equal to 0.05 mm and is smaller than or equal to 1.5 mm, such as 1 mm.

The outer circumferential lower edge 2 is provided with a chamfer 21, of which the dimension in the axial direction A and/or radial direction R may be smaller than or equal to 0.05 mm. Alternatively, the dimension of the chamfer 21 of the outer circumferential lower edge 2 in the axial direction A and/or radial direction R may be larger than or equal to 0 mm and is smaller than or equal to 0.1 mm. The chamfer 21 may be a non-round chamfer or a round chamfer.

The present disclosure further proposes a processing method for the piston ring. The afore-described piston ring can be obtained through the processing method. The processing method comprises a step of providing no nitride layer in an area of the working surface 3 and/or the lower surface 4 close to the outer circumferential lower edge 2 of the piston ring body 1.

Figure 5:
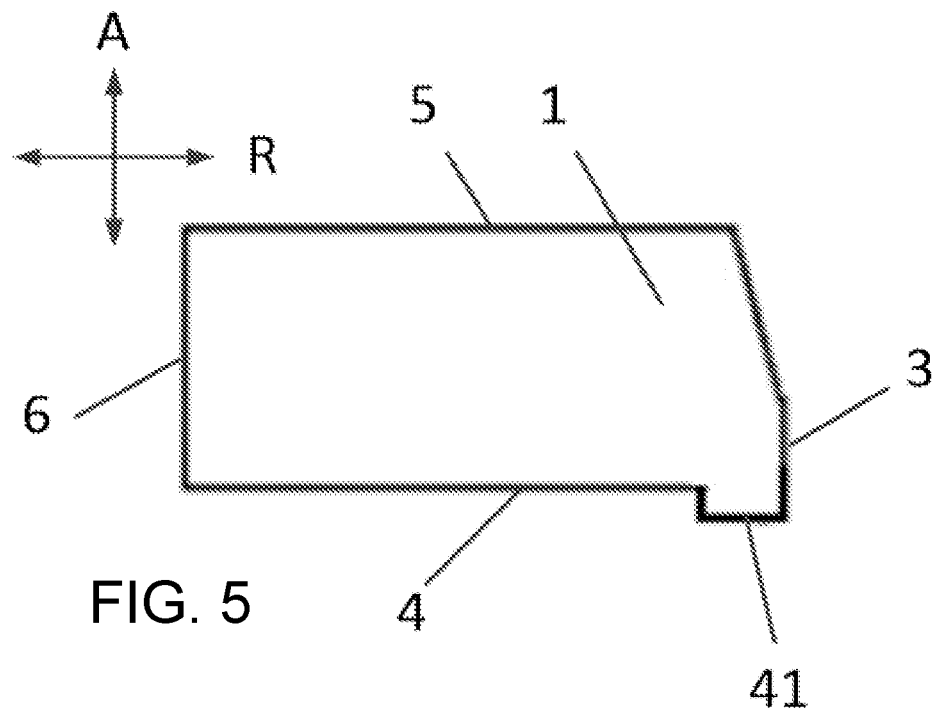
FIG. 5 is a schematic sectional view of another piston ring provided with a boss in a local area according to an embodiment of the present disclosure.

As shown in FIG. 5, according to an embodiment of the present disclosure, the processing method comprises:

forming a boss protruding from an area of the working surface 3 and/or the lower surface 4 (the lower surface 4 shown in FIG. 5) close to the outer circumferential lower edge 2 of the piston ring body 1;

performing nitrogen treatment on the piston ring body 1 and the boss; and removing the boss and forming the chamfer 21 at the outer circumferential lower edge 2.

Since the lower surface local area 41 and/or the working surface local area 31 is provided with the boss, the lower surface local area 41 and/or the working surface local area 31 obtained by grinding off the boss after the nitrogen treatment is not subjected to the nitrogen treatment (without a nitride layer). By forming the chamfer 21 in the area that has not been subjected to the nitrogen treatment, it is possible to obtain the chamfer 21 that is not subjected to the nitrogen treatment (without a nitride layer) and that has a dimension in the axial direction A and/or the radial direction R smaller than or equal to 0.1 mm, in particular smaller than or equal to 0.05 mm. The chamfer 21 without a nitride layer is more flexible than a chamfer with a nitride layer and is not brittle.

Figure 6:
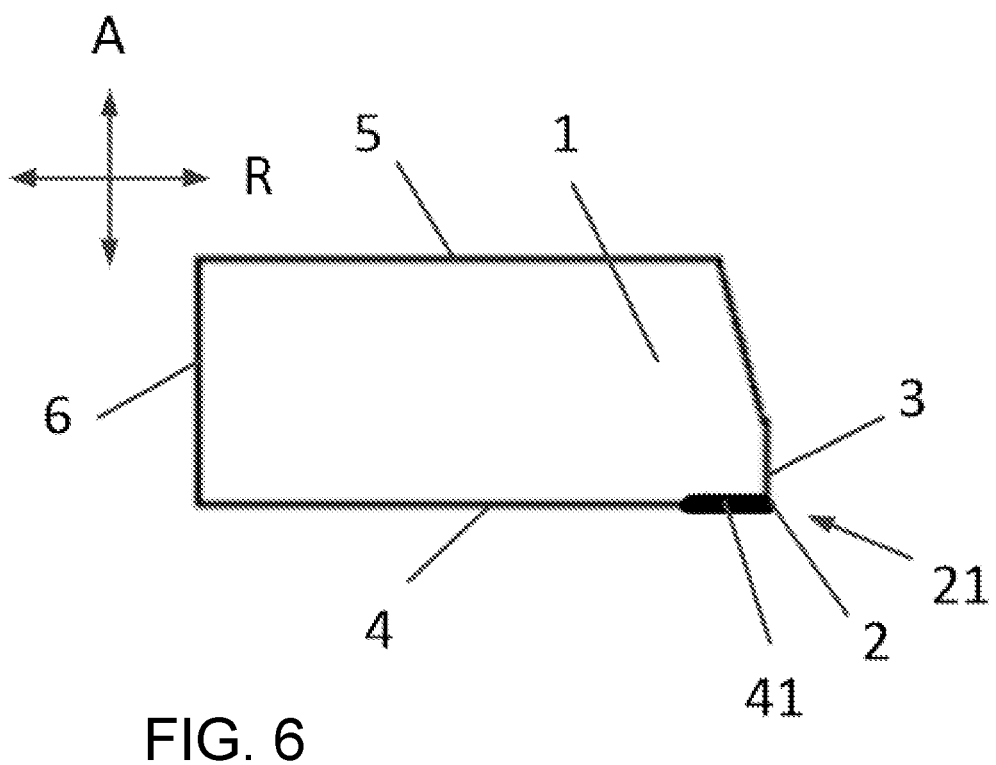
FIG. 6 is a schematic sectional view of another piston ring provided with a protective layer in a local area according to an embodiment of the present disclosure.

As shown in FIG. 6, according to another embodiment of the present disclosure, the processing method comprises:

forming the chamfer 21 at the outer circumferential lower edge 2;

providing a protective layer that prevents the piston ring body 1 from nitridation, more specifically prevents a portion of the piston ring body 1 covered by the protective layer from nitridation, at the working surface local area 31 of the working surface 3 close to the outer circumferential lower edge 1 of the piston ring body 1 and/or the lower surface local area 41 of the lower surface 4 close to the outer circumferential lower edge 2 of the piston ring body 2 and at the chamfer 21; and performing nitrogen treatment on the piston ring body 1. The protective layer may be a nickel layer or a chrome layer.

It is appreciated that the protective layer is provided on the lower surface local area 41 as shown in FIG. 6. The same purpose can be achieved by providing the protective layer on the working surface local area 31 or providing the protective layer on the lower surface local area 41 and the working surface local area 31.

It is appreciated that attributing to the protective layer containing nickel for example, nitridation cannot be carried out in the respective area (not the entire piston ring body 1 being prevented from nitridation). After the piston ring body 1 is entirely subjected to the nitrogen treatment, the area protected by the protective layer is not nitrided so that the firstly processed chamfer 21 with a dimension in the axial direction A and/or the radial direction R smaller than 0.1 mm and its surrounding area are not subjected to nitridation.

It is appreciated that some of the figures do not show the nickel layer (thick line) on the chamfer 21 while some figures only schematically show the nickel layer with a thick line causing the chamfer not so apparent. However, in the piston ring of the present disclosure, in a case where the chamfer is formed before forming the nickel layer, the chamfer is preferably provided with a nickel layer so as to be prevented from nitridation.

It is appreciated that the protective layer is not limited to a nickel layer or a chrome layer. The plating process for forming the protective layer includes, but not limited to, chemical plating. The protective layer may be removed or detached in subsequent processing. The protective layer will not form a nitride layer (nitrided layer) through the nitrogen treatment (e.g., nitriding treatment). Preferably, the protective layer has a hardness or brittleness that is smaller than that of the nitride layer.

Described in the foregoing are the preferable embodiments of the present disclosure. It should be noted that various improvement and refinement can be made by a person skilled in the art without departing from the principles of the present disclosure, which should also be deemed within the scope of protection of the present disclosure.

What is claimed is:

1. A piston ring for an engine, the piston ring comprising:
   a piston ring body including a working surface, a lower surface, an upper surface, and an inner surface;
   wherein an area of the working surface which is close to an outer circumferential lower edge of the piston ring body is not provided with a nitride layer, the outer circumferential lower edge is formed with a chamfer, the chamfer does not have a nitride layer, and an additional area of the working surface has a nitride layer.

2. The piston ring according to claim 1, wherein an area of the piston ring body which is not provided with a nitride layer includes a lower surface local area that is located on the lower surface and is close to the outer circumferential lower edge.

3. The piston ring according to claim 1, wherein:
   an area of the piston ring body which is not provided with a nitride layer includes a working surface local area that is located on the working surface and is close to the outer circumferential lower edge, wherein the working surface local area is provided with a protective layer that prevents the piston ring body from nitridation; and/or
   an area of the piston ring body which is not provided with a nitride layer includes a lower surface local area that is located on the lower surface and is close to the outer circumferential lower edge, wherein the lower surface local area is provided with a protective layer that prevents the piston ring body from nitridation.

4. The piston ring according to claim 1, wherein an axial dimension and/or a radial dimension of an area of the piston ring body which is not provided with a nitride layer is larger than or equal to 0.05 mm and is smaller than or equal to 1.5 mm.

5. The piston ring according to claim 1, wherein an axial dimension and/or a radial dimension of the chamfer is smaller than or equal to 0.05 mm.

6. The piston ring according to claim 1, wherein an axial dimension and/or a radial dimension of the chamfer is smaller than or equal to 0.1 mm.

7. A processing method for the piston ring according to claim 1, the method comprising:
   forming the chamfer at the outer circumferential lower edge;
   providing a protective layer that prevents the piston ring body from nitridation at a working surface local area of the working surface close to the outer circumferential lower edge of the piston ring body and/or a lower surface local area of the lower surface close to the outer circumferential lower edge of the piston ring body and at the chamfer; and
   performing nitrogen treatment on the piston ring body.

8. The processing method according to claim 7, wherein the protective layer that prevents the piston ring body from nitridation includes one of a chrome layer or a nickel layer, and the protective layer is provided on the piston ring body by a plating process including chemical plating.

9. A processing method for a piston ring including a piston ring body having a working surface, a lower surface, an upper surface, an inner surface, and an outer circumferential lower edge connecting the working surface with the lower surface, the method comprising:

forming a boss protruding from an area of the working surface and/or the lower surface close to the outer circumferential lower edge of the piston ring body;

performing nitrogen treatment on the piston ring body and the boss; and removing the boss and forming a chamfer at the outer circumferential lower edge such that a portion of the working surface and the chamfer do not include a nitride layer.

10. A piston ring, comprising:

a piston ring body including a working surface, a lower surface, and an outer circumferential lower edge;

wherein the outer circumferential lower edge includes a chamfer;

a portion of the working surface disposed adjacent to the outer circumferential lower edge, a portion of the lower surface disposed adjacent to the outer circumferential lower edge, and the chamfer do not include a nitride layer; and an additional portion of the working surface and an additional portion of the lower surface include a nitride layer.

11. The piston ring according to claim 10, wherein the portion of the working surface is provided with a protective layer that prevents the portion of the working surface from nitridation.

12. The piston ring according to claim 10, wherein the portion of the lower surface is provided with a protective layer that prevents the portion of the lower surface from nitridation.

13. The piston ring according to claim 10, wherein an axial dimension and/or a radial dimension of an area of the piston ring body which is not provided with a nitride layer is larger than or equal to 0.05 mm and is smaller than or equal to 1.5 mm.

14. The piston ring according to claim 10, wherein an axial dimension and/or a radial dimension of the chamfer is smaller than or equal to 0.05 mm.

15. The piston ring according to claim 10, wherein an axial dimension and/or a radial dimension of the chamfer is smaller than or equal to 0.1 mm.

16. A processing method for the piston ring according to claim 10, the method comprising:

forming the chamfer at the outer circumferential lower edge;

providing a protective layer that prevents the piston ring body from nitridation at the portion of the working surface, the portion of the lower surface, and at the chamfer; and performing nitrogen treatment on the piston ring body such that the nitride layer is formed at the additional portion of the working surface and the additional portion of the lower surface.

\* \* \* \* \*